May 3, 1966          N. L. STAUFFER          3,249,006

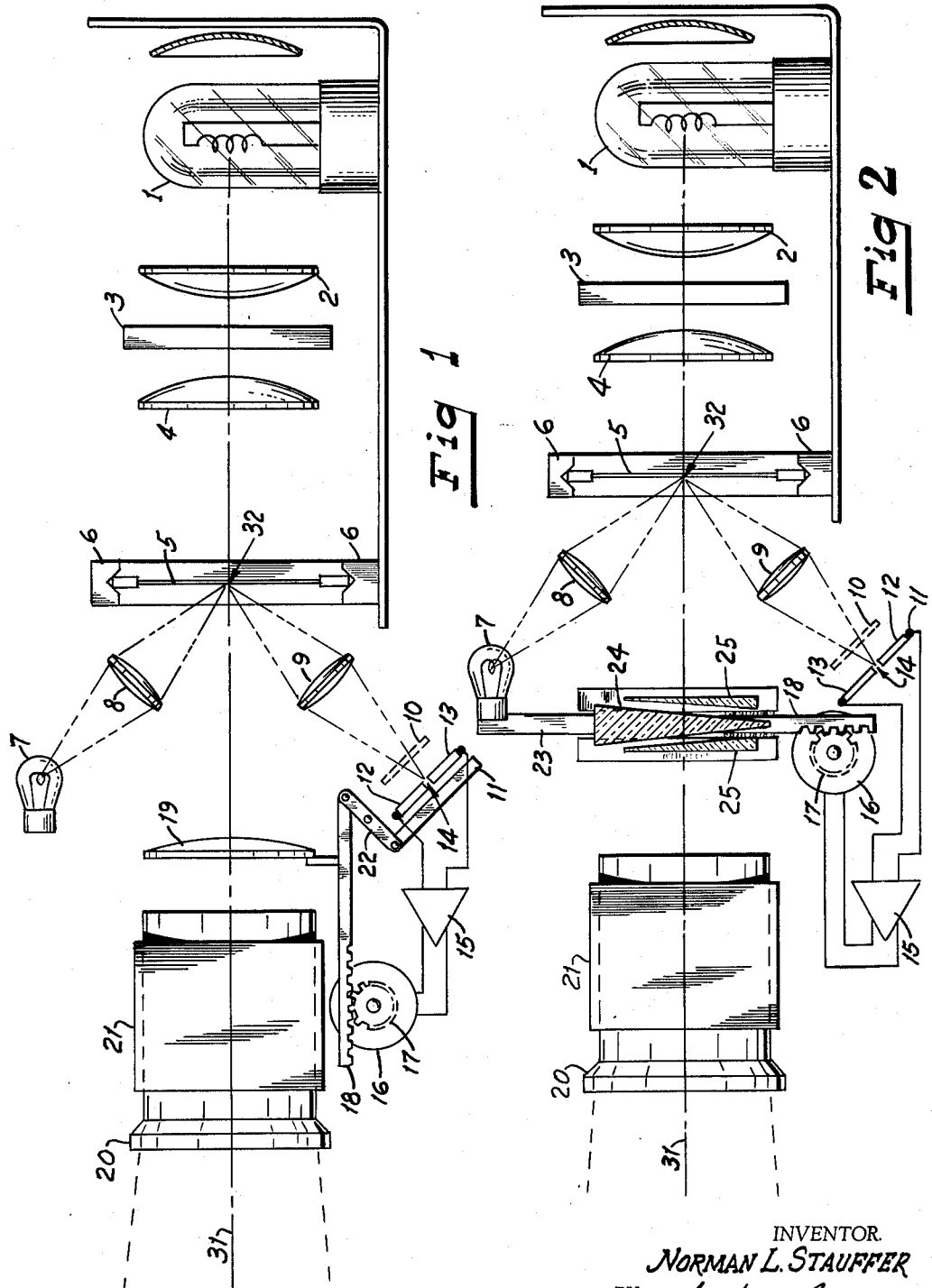

AUTOMATIC FOCUSING PHOTOGRAPHIC PROJECTOR

Filed April 14, 1964                                   2 Sheets-Sheet 2

INVENTOR.
NORMAN L. STAUFFER
BY
Arthur H. Swanson

United States Patent Office 3,249,006
Patented May 3, 1966

3,249,006
AUTOMATIC FOCUSING PHOTOGRAPHIC PROJECTOR
Norman L. Stauffer, Englewood, Colo., assignor to Honeywell Inc., a corporation of Delaware
Filed Apr. 14, 1964, Ser. No. 359,592
6 Claims. (Cl. 88—24)

This application is a continuation-in-part of copending application of Norman L. Stauffer, Serial No. 286,708, filed June 10, 1963.

This invention is concerned with an improved photographic slide projector having an objective or projection lens which is adapted to focus a projected image of a slide on a screen or the like.

It is an object of this invention to provide means to maintain such a projector automatically in focus. One such means includes a first means to form an image of a radiation source at the normal plane of the slide, second means to re-image the reflected image of the radiation source on differential radiation-sensing means responsive to the position of said re-image thereon, an optical element positioned between the slide and the projection screen, and third means controlled by said sensing means to provide relative motion between said optical element and the lens so as to properly refocus the projection or objective lens and to restore the relative position of said re-image and said sensing means.

A further object of this invention is to provide a photographic slide projector having an objective or projection lens which is adapted to focus a projected image of a slide on a screen or the like, first means to form an image of a radiation source at the normal plane of the slide, second means to re-image the reflected image of the radiation source on differential radiation-sensing means responsive to the position of said re-image thereon, an optical wedge movable between said slide and said projection or objective lens so as to change the "optical length" between them and restore proper focus, and third means controlled by said sensing means to move said optical wedge so as to refocus said projection or objective lens and to restore the relative position of said re-image and said sensing means.

Yet an additional object of this invention is to provide a photographic slide projector having an objective or projection lens which is adapted to focus a projected image of a slide on a screen or the like, including means to maintain a constant distance between said slide and said projection or objective lens, first means to form an image of a radiation source at the normal plane of said slide, second means to re-image the reflected image of the radiation source on differential radiation-sensing means responsive to the position of said re-image thereon, means mounting said slide for rectilinear motion along the axis of said projection or objective lens, and third means controlled by the sensing means to move the slide rectilinearly along the axis of said projection or objective lens to return the slide to its normal plane of proper focus which will also cause the re-image to return to null position on the sensing means.

This invention will be apparent to those skilled in the art upon reference to the following specification, claims, and drawings, of which:

FIG. 1 is a diagrammatic or schematic drawing showing an optical element mounted between the slide and the projection or objective lens of a projector according to the present invention, said optical element being movable to restore the focus of the projection or objective lens.

FIG. 2 is a diagrammatic or schematic drawing showing a modified form of the invention in which there is provided an optical wedge between the slide and the objective or projection lens, this optical wedge being adapted to change the "optical length" between the slide and the projection lens and to restore the proper focus of the objective or projection lens.

Figure 3:
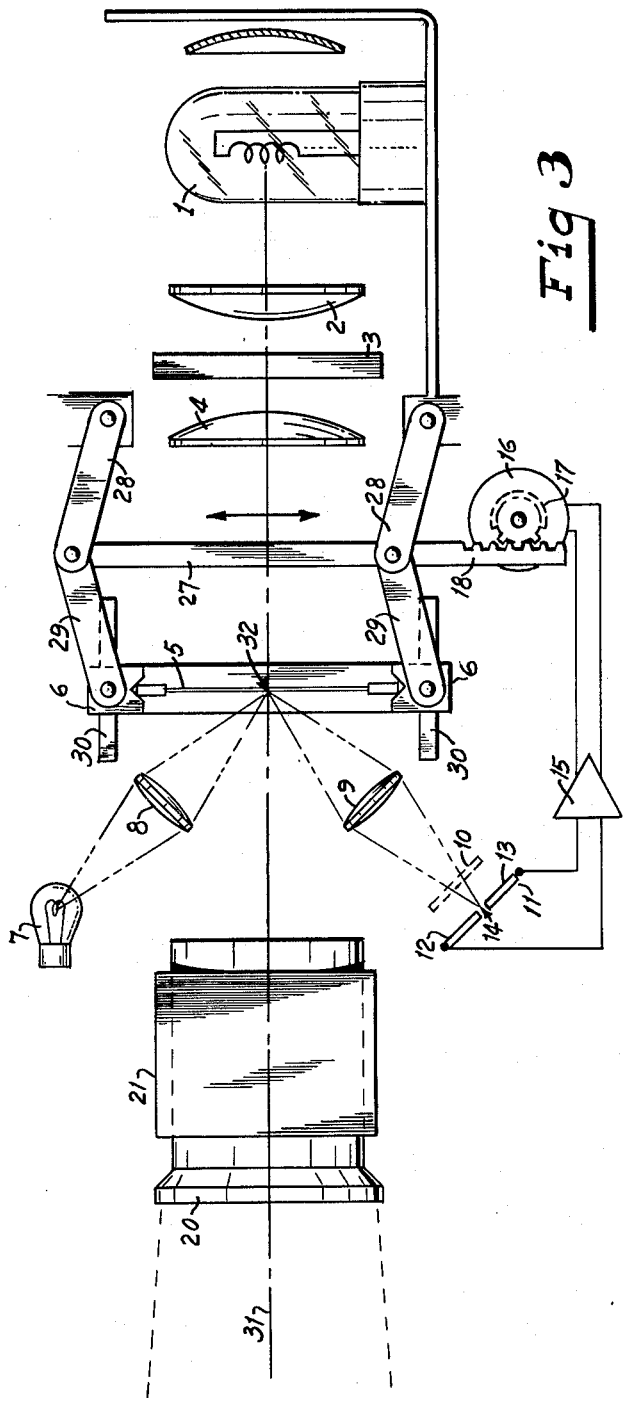
FIG. 3 is a schematic or diagrammatic showing of a second modification in which the slide is mounted for rectilinear movement along the optical axis of the projection or objective lens.

Referring to FIG. 1, there is provided a source 1 of radiation of a first characteristic which directs radiant energy, such as light, directly down an optical axis identified by the broken line 31. Source 1 is shown as an electric light bulb including an incandescent filament which, for the purpose of simplicity, is considered to be a point source.

Light or radiant energy generated by bulb 1 passes through a first condenser lens 2, a slide filter 3, and a second condenser lens 4. Slide filter 3 possesses selective radiant energy transmission properties and in a sense "cools" the light generated by lamp 1. The major portion of the radiation from lamp 1 lies in the infra-red region in the vicinity of 1 micron. The visible region is normally considered to exist from 0.4 to 0.7 micron, with the ultra-violet region lying below 0.4 micron. The major portion of the illumination delivered from lamp 1 to slide 5 consists of visible radiation. A certain amount of ultra-violet radiation passes onto the slide 5 and a small amount of infra-red radiation passes onto the slide 5 to heat the slide.

Condensing lenses 2 and 4 control the illumination of lamp 1 to illuminate the slide 5 positioned in a pair of stationary slide guides 6.

The illuminated slide 5 is then focused on a screen or the like (not shown) by means of a movable objective lens 20 which is movably held in a holder 21. Lens 20 may be moved manually or automatically, directly or from a distance by suitable means (not shown).

It is the intention that objective lens 20, slide guide 6, condensing lenses 2 and 4, slide filter 3, and bulb 1 be representative showings of the conventional components to be found in photographic projectors. For purposes of simplicity, these components are shown somewhat diagrammatically. It is further intended that this projector may be manually, semi-automatically, or automatically operated.

The stationary-slide guides 6 define a generally vertical plane, which is generally perpendicular to optical axis 31, at which plane slide 5 is adapted to be positioned. An essential feature of this invention utilizes the concept of focusing a pattern of radiant energy at the plane defined by the slide guides 6 and to then re-image this pattern at radiation-sensitive means which is sensitive to this position of this re-image pattern. Motive means is then energized by the radiation-sensitive means to reposition an optical element 19 along the optical axis 31 and to also reposition a further means to provide repositioning of the re-image pattern on the radiation-sensitive means.

In FIG. 1 there is provided a source 7 of radiant energy of a second characteristic which is different from the characteristic of the energy which illuminates slide 5. Radiant energy from lamp 7 is controlled by a first lens 8 which focuses an image of the source (in this case, lamp 7) at a spot 32 on the plane defined by the slide guides 6 and occupied by slide 5 in its "flat" condition, that is, the condition of the slide when it has not crept, buckled, or popped. Furthermore, lens 8 and its associated components are arranged to project this image, in focus, at spot 32, and at an angle to the optical axis 31 of the projector. Thus, the radiant energy of the second characteristic (rich in infra-red) is reflected from the surface of the slide 5 and is refocused (re-imaged) by a second lens 9 at a point 14 adjacent radiation-sensitive means 11 in the form of a pair of closely-spaced photoeletric cells 12 and 13.

Photoelectric cells 12 and 13 may be constructed to be sensitive primarily to the infra-red or second-characteristic energy. Also, filter means 10 may be associated with cells 12 and 13 to pass the infra-red energy to the photoelectric cells 12 and 13. Lens 9 is mounted approximately half-way between point 32 and point 14 between cells 12 and 13.

Radiation-sensitive means 11 comprises photoelectric cells 12 and 13 which are photo-resistive devices whose impedance varies with the amount of illumination impinging upon each cell. When spot 14 exists at a point between the cells, the cells are equally illuminated and have approximately equal resistance so that the voltage provided at the input electrodes of amplifier 15 is approximately zero. As the point 14 shifts onto one of the cells and away from the other cell, the amplifier 15 is energized and motor 16 is driven in a proper direction to re-establish the focus of the projection lens 20 and to reposition spot 14 at the point between the photoelectric cells which approximately equally illuminates the photoelectric cells.

Motor 16 drives a gear 17 which meshes with a rack 18 on which is mounted the optical element 19 such as a lens. Element 19 may be positioned at any place between the slide 5 and the projection screen on which the projection lens 20 focuses the image of the slide 5.

Rack 18 is also connected to a portion of a lever 22 connected at another portion to the radiation-sensitive means 11 and adapted to reposition the radiation-sensitive means 11 so that the point 14 lies between the cells 12 and 13.

The operation of this invention is as follows. Initially, the slide 5, which is positioned at the optical axis 31, is relatively cool and exists in a "flat" condition, as is shown in FIG. 1. The operator of the projector then controls the means for moving the objective lens 20 along the optical axis 31 within the stationary holder 21, to produce a sharp and clear focus of the image of the slide on a screen (not shown). The temperature of the slide is then increased as it remains in the slide guides 6. The heating of the slide 5 causes it to expand, to creep, or to pop, to a buckled position. Lens 8 continues to focus a pattern or spot at point 32. However, the light provided by this optical system continues along its inclined axis, striking the new position of the slide 5 at a point away from the point 32. Insofar as the optical system including the lens 8 is concerned, the appparent position of spot 32 has now shifted. Actually, the center portion of slide 5 has shifted. The apparent position of spot 32, has, however, shifted a distance twice this amount. As a result of this shifting, the optical system, including lens 9, causes the re-image of the pattern or spot to illuminate one photocell more than the other is illuminated. As a result, amplifier 15 is energized and motor 16 runs in a direction to cause the optical element 19 to move along the optical axis 31 in one direction or the other and to properly focus the image of the slide 5 on the screen. When proper focus has been obtained by the movement of optical element 19, the re-image of lamp 7 has moved so that spot 14 lies between the photoelectric cells 12 and 13 and motor 16 stops. Although motor 16 is shown as actuating radiation-sensitive means 11, motor 16 can be connected so as to move lamp 7, lens 8, or lens 9 or some combination of these elements to return the spot 14 to the null position between the cells 12 and 13.

From the above description it can be seen that this invention provides an improved photographic projector in which the focus is automatically maintained by the use of a second light source of different characteristics (to prevent interference with the main light source) and in which a separate optical element having positive or negative characteristics varies the focus of the projection or objective lens to maintain a slide focused on a screen.

FIG. 2 shows a modification of this invention which employs an optical wedge in place of the optical element 19, shown in FIG. 1. FIG. 2 shows means to automatically focus slide 5 by moving the movable element 24 of the optical wedge, generally indicated 23, and having stationary elements 25. Optical wedge 23 is located between the projection lens 20 and the slide 5. Movement of the movable element 24 changes the "optical length" between the slide 5 and the projection lens 20 and restores proper focus. At the same time, the motion of the movable element of the optical wedge is coupled to the source 7 of radiation of the second characteristics so that source 7 is moved so as to return the spot reflected by the surface of slide 5 to the point 14 between the photoelectric cells 12 and 13. This stops the movable element 24 in a position to restore proper focus on the screen.

Although the movable element 24 is shown as connected to the source 7 of radiation of the second characteristic, movable element 24 might just as well be connected to lens 8, to lens 9, or to radiation-sensitive means 11 so as to move one or a combination of these elements so as to return the spot 14 to its null position and stop further movement of motor 16.

The elements of the modification of FIG. 2 which are duplicates of the elements of FIG. 1 have been given the same reference numerals.

FIG. 3 shows a modification of the automatic-slide-focus system which provides focus action and a null of the servo system by parallel motion of the slide. In this modification, motion is imparted to the slide 5 by the motor 16 which is connected to the radiation-sensing means 11. Motor 16 is connected to gear 17 and rack 18 which is fastened to a center bar 27 having pivotal connection with a movable portion of a pair of pivoted levers 28 and with a movable portion of a pair of guided levers 29. Another movable portion of the guided levers 29 is connected to the slide guides 6 in which the slide 5 is mounted. The slide guides 6 and connected portions of the guided levers 29 are mounted in stationary guides 30. Movement of the motor 16 thus moves slide 5 along optical axis 31 but maintains slide 5 substantially perpendicular to the optical axis 31.

In this modification, the elements which are the same as those of FIG. 1 have been given the same reference characters and operate in the same way.

What is claimed is:
1. A photographic slide projector including
a projection radiation source,
an objective lens,
optical means located on an optical axis between said source and said lens and including slide guide means to position on said axis a slide an image of which is to be projected in focus by said lens onto a screen or the like,
first means including means to form an image of a radiation source at the normal plane of the slide,
second means to re-image the reflected image of the radiation source at a point upon differential radiation-sensitive means responsive to the position of said re-image thereon,
and third means controlled by said sensing means to move at least a portion of said optical means relative to said lens without variation in the angular relationship tof the slide and said lens with respect to said axis, and to maintain a balanced positional relationship of said re-image and said sensing means, to maintain the projected image of the slide in focus.

2. A combination according to claim 1 wherein said optical means includes a second lens located on said axis on the objective lens side of said slide guide means, and wherein said portion is said second lens.

3. A combination according to claim 1 in which said third means moves said sensing means so that said re-image falls in the null position thereof.

4. A combination according to claim 1 in which said first means includes a radiation source, and in which said third means includes means for moving said radiation source to restore the relative position of said re-image and said sensing means.

5. A combination according to claim 1 wherein said optical means includes an optical wedge located on said axis on the lens side of said slide guide means, and wherein said portion is said optical wedge.

6. A combination according to claim 1 wherein said portion is said slide guide means.

References Cited by the Examiner

UNITED STATES PATENTS

| 2,947,215 | 8/1960 | Mitchell | 88—24 |
| 3,037,423 | 6/1962 | Shurcliff | 88—26 |
| 3,205,766 | 9/1965 | Emald et al. | 88—24 |

FOREIGN PATENTS

| 903,962 | 10/1945 | France. |
| 823,404 | 11/1959 | Great Britain. |

OTHER REFERENCES

VEB: German application No. 1,127,617, published Apr. 12, 1962 (1 sht. dwg., 2 pp. spec.).

NORTON ANSHER, *Primary Examiner*.